United States Patent
Poppen et al.

(10) Patent No.: US 10,527,444 B2
(45) Date of Patent: Jan. 7, 2020

(54) POINT OF INTEREST SEARCH ALONG A ROUTE

(71) Applicant: Uber Technologies, Inc., San Francisco, CA (US)

(72) Inventors: Richard F. Poppen, San Jose, CA (US); Weidong Tang, Dailian (CN); Daniel R. Brownstone, New York, NY (US)

(73) Assignee: Uber Technologies, Inc., San Francisco, CA (US)

( * ) Notice: Subject to any disclaimer, the term of this patent is extended or adjusted under 35 U.S.C. 154(b) by 95 days.

(21) Appl. No.: 15/689,866

(22) Filed: Aug. 29, 2017

(65) Prior Publication Data
US 2018/0010920 A1    Jan. 11, 2018

Related U.S. Application Data (63) Continuation of application No. 15/082,849, filed on Mar. 28, 2016, now Pat. No. 9,778,059, which is a
(Continued)

(51) Int. Cl.
*G01C 21/36* (2006.01)
*G01C 21/34* (2006.01)
*G01S 19/42* (2010.01)

(52) U.S. Cl.
CPC ..... *G01C 21/3626* (2013.01); *G01C 21/3476* (2013.01); *G01C 21/3617* (2013.01); *G01C 21/3679* (2013.01); *G01S 19/42* (2013.01)

(58) Field of Classification Search
CPC ............ G01C 21/3626; G01C 21/3476; G01C 21/3617; G01S 19/42
(Continued)

(56) References Cited

U.S. PATENT DOCUMENTS

| 5,893,081 A | 4/1999 | Poppen |
| 5,963,956 A | 10/1999 | Smartt |

(Continued)

FOREIGN PATENT DOCUMENTS

| CN | 1550755 | 12/2004 |
| CN | 1828228 | 9/2006 |

(Continued)

OTHER PUBLICATIONS

Australian Examination Report, Australian Patent Application No. 2009231001, dated Apr. 3, 2013, 4 pages.
(Continued)

*Primary Examiner* — Yazan A Soofi
(74) *Attorney, Agent, or Firm* — Fenwick & West LLP (57) ABSTRACT

A system includes a GPS module, user interface module, database and routing engine. To find nearby POIs in one embodiment the routing engine identifies POIs in the database located within a threshold distance from the planned route in Euclidean distance. The routing engine filters the results by exploring the road network to determine whether each of the POIs is within the threshold distance of the route in driving distance. The filtering may include exploring outward from the POI, until all roads within the threshold distance are explored or the route is reached; alternatively, distance to the POIs is checked by exploring outward from the route until all roads within the threshold distance of the route have been exposed. For those POIs reached in the exploration, the nearest point on the route and the distance to that point are known. Similar searches are performed based on driving time rather than distance.

20 Claims, 5 Drawing Sheets

Related U.S. Application Data continuation of application No. 12/936,128, filed as application No. PCT/CN2009/071127 on Apr. 1, 2009, now Pat. No. 9,304,008.

(60) Provisional application No. 61/041,496, filed on Apr. 1, 2008.

(58) Field of Classification Search
USPC .......................................................... 701/201
See application file for complete search history.

(56) References Cited

U.S. PATENT DOCUMENTS

| | | |
|---|---|---|
| 5,978,730 A | 11/1999 | Poppen et al. |
| 6,038,509 A | 3/2000 | Poppen et al. |
| 6,321,158 B1 | 11/2001 | DeLorme et al. |
| 6,377,887 B1 | 4/2002 | Poppen et al. |
| 6,377,889 B1 | 4/2002 | Soest |
| 6,401,034 B1 | 6/2002 | Kaplan et al. |
| 6,507,291 B1 | 1/2003 | Schreiner |
| 6,587,782 B1 | 7/2003 | Nocek et al. |
| 6,859,724 B2 | 2/2005 | Komatsu |
| 7,133,771 B1 | 11/2006 | Nesbitt |
| 7,474,960 B1 | 1/2009 | Nesbitt |
| 7,546,203 B2 | 6/2009 | Miyashita |
| 7,565,239 B2 | 7/2009 | de Silva et al. |
| 7,698,062 B1 | 4/2010 | McMullen et al. |
| 7,818,116 B1 | 10/2010 | Nesbitt |
| 7,904,238 B2 | 3/2011 | Nesbitt |
| 8,095,303 B1 | 1/2012 | Nesbitt et al. |
| 8,243,060 B2 | 8/2012 | Stitt et al. |
| 8,260,549 B2 | 9/2012 | Poppen |
| 8,401,786 B2 | 3/2013 | Poppen et al. |
| 8,467,960 B2 | 6/2013 | Rinscheid |
| 8,630,791 B2 | 1/2014 | Yuasa |
| 8,781,729 B2 | 7/2014 | Nesbitt et al. |
| 8,892,350 B2 | 11/2014 | Weir et al. |
| 9,557,182 B2 | 1/2017 | Nesbitt et al. |
| 2001/0004725 A1 | 6/2001 | Yagyu |
| 2002/0047787 A1 | 4/2002 | Mikkola et al. |
| 2002/0130906 A1 | 9/2002 | Miyaki |
| 2002/0133292 A1 | 9/2002 | Miyaki |
| 2003/0028320 A1 | 2/2003 | Niitsuma |
| 2003/0036848 A1 | 2/2003 | Sheha et al. |
| 2003/0125870 A1 | 7/2003 | Woestemeyer et al. |
| 2003/0216860 A1 | 11/2003 | Shitamatsu et al. |
| 2004/0083055 A1 | 4/2004 | Hirose et al. |
| 2004/0102899 A1 | 5/2004 | Kaji et al. |
| 2004/0143387 A1 | 7/2004 | Shimizu et al. |
| 2004/0172193 A1 | 9/2004 | Monde et al. |
| 2004/0215388 A1 | 10/2004 | Takenaka |
| 2004/0260465 A1 | 12/2004 | Tu |
| 2005/0107949 A1 | 5/2005 | Yokota |
| 2005/0171686 A1 | 8/2005 | Davis |
| 2005/0216191 A1 | 9/2005 | Sumizawa et al. |
| 2005/0251327 A1 | 11/2005 | Ogasawara et al. |
| 2006/0106534 A1 | 5/2006 | Kawamata et al. |
| 2006/0116815 A1 | 6/2006 | Nomura |
| 2007/0005235 A1 | 1/2007 | Suzuki et al. |
| 2007/0005242 A1 | 1/2007 | Kato et al. |
| 2007/0010942 A1 | 1/2007 | Bill |
| 2007/0032947 A1 | 2/2007 | Yamada et al. |
| 2007/0156334 A1 | 7/2007 | Vu |
| 2007/0203638 A1 | 8/2007 | Tooyama et al. |
| 2007/0225910 A1 | 9/2007 | Fujiwara |
| 2008/0027639 A1 | 1/2008 | Tryon |
| 2008/0051995 A1* | 2/2008 | Lokshin .............. G01C 21/3415 701/416 |
| 2008/0071471 A1* | 3/2008 | Sumizawa ......... G01C 21/3415 701/414 |
| 2008/0077314 A1 | 3/2008 | Ishikawa |
| 2008/0177463 A1 | 7/2008 | Hamaguchi |
| 2008/0177465 A1 | 7/2008 | Barber et al. |
| 2008/0270014 A1 | 10/2008 | Nagase et al. |
| 2009/0018766 A1 | 1/2009 | Chen et al. |
| 2009/0037101 A1* | 2/2009 | Koike ................ G01C 21/3664 701/533 |
| 2009/0082953 A1 | 3/2009 | Shimizu |
| 2009/0088964 A1 | 4/2009 | Schaaf et al. |
| 2009/0171561 A1 | 7/2009 | Geelen |
| 2009/0192705 A1 | 7/2009 | Golding et al. |
| 2009/0216732 A1 | 8/2009 | Feng |
| 2009/0234577 A1* | 9/2009 | Rinscheid .......... G01C 21/3415 701/533 |
| 2009/0281716 A1 | 11/2009 | Jung et al. |
| 2009/0319177 A1 | 12/2009 | Khosravy et al. |
| 2010/0088018 A1* | 4/2010 | Tsurutome ......... G01C 21/3682 701/533 |
| 2010/0152997 A1 | 6/2010 | de Silva et al. |
| 2010/0251088 A1* | 9/2010 | Rasmussen .......... G09B 29/106 715/208 |
| 2010/0268449 A1 | 10/2010 | Feng |
| 2012/0046819 A1 | 2/2012 | Agrawal et al. |
| 2012/0123678 A1* | 5/2012 | Poppen .............. G01C 21/3476 701/468 |
| 2012/0197525 A1* | 8/2012 | Noro .................. G01C 21/3626 701/437 |
| 2015/0066649 A1* | 3/2015 | Kumar ................... G06Q 30/02 705/14.64 |
| 2015/0285652 A1 | 10/2015 | Peri et al. |
| 2016/0245663 A1 | 8/2016 | van Dok et al. |
| 2018/0017397 A1 | 1/2018 | Hou |

FOREIGN PATENT DOCUMENTS

| | | |
|---|---|---|
| CN | 1906463 | 1/2007 |
| CN | 101000371 | 7/2007 |
| EP | 1376059 | 1/2004 |
| EP | 1936519 | 6/2008 |
| JP | 2004-257966 | 9/2004 |
| JP | 2006-170950 | 6/2006 |
| JP | 2007-024624 | 2/2007 |
| JP | 2007-40721 | 2/2007 |
| JP | 2007-218770 | 8/2007 |
| KR | 10-2009-0018380 A | 2/2009 |
| WO | WO 2007/037281 | 4/2007 |
| WO | WO 2008/083749 | 7/2008 |
| WO | WO 2010/111833 | 10/2010 |

OTHER PUBLICATIONS

Australian First Examination Report, Australian Patent Application No. 2014280972, dated May 23, 2016, 2 pages.
Australian Fourth Examination Report, Australian Patent Application No. 2009343389, dated Apr. 23, 2015, 3 pages.
Australian Office Action, Australian Patent Application No. 2009343389, dated Jan. 24, 2014, 3 pages.
Australian Second Examination Report, Australian Patent Application No. 2009343389, dated Aug. 29, 2014, 3 pages.
Australian Second Examination Report, Australian Patent Application No. 2014280972, dated Mar. 21, 2017, 3 pages.
Australian Third Examination Report, Australian Patent Application No. 2009343389, dated Feb. 3, 2015, 3 pages.
Canadian Office Action, Canadian Patent Application No. 2,719,702, dated Oct. 21, 2015, 4 pages.
Canadian Office Action, Canadian Patent Application No. 2,757,148, dated Oct. 21, 2015, 5 pages.
Chinese First Office Action, Chinese Patent Application No. 200980159608.6, dated Dec. 3, 2013, 8 pages.
Chinese Fourth Office Action, Chinese Patent Application No. 200980159608.6, dated Sep. 30, 2015, 4 pages.
Chinese Office Action, Chinese Patent Application No. 200980118512.5, dated Aug. 29, 2012, 21 pages.
Chinese Second Office Action, Chinese Patent Application No. 200980118512.5, dated Aug. 28, 2014, 23 pages.
Chinese Second Office Action, Chinese Patent Application No. 200980118512.5, dated Nov. 29, 2013, 19 pages.
Chinese Second Office Action, Chinese Patent Application No. 200980159608.6, dated May 19, 2014, 13 pages.

(56) References Cited

OTHER PUBLICATIONS

Chinese Third Office Action, Chinese Patent Application No. 200980159608.6, dated Jan. 19, 2015, 13 pages.
European Examination Report, European Patent Application No. 09726607.6, dated Apr. 3, 2014, 5 pages.
European Examination Report, European Patent Application No. 09842490.6, dated May 3, 2016, 4 pages.
European Extended Search Report, European Patent Application No. 09726607.6, dated Nov. 7, 2012, 9 pages.
European Extended Search Report, European Patent Application No. 09842490.6, dated Apr. 7, 2014. 5 pages.
European Second Examination Report, European Patent Application No. 09726607.6, dated Dec. 4, 2014, 7 pages.
European Summons to Attend Oral Proceedings Pursuant to Rule 115(1) EPC, European Patent Application No. 09726607.6, dated Feb. 15, 2016, 7 pages.
Korean Office Action, Korean Patent Application No. 10-2011-7025842, dated Dec. 7, 2015, 4 pages (with concise explanation of relevance).
Korean Office Action, Korean Patent Application No. 10-2011-7025842, dated Mar. 3, 2016, 10 pages.
Korean Office Action, Korean Patent Application No. 10-2011-7025842, dated May 15, 2015, 10 pages.
PCT International Search Report and Written Opinion, PCT Patent Application No. PCT/CN2009/071126, dated Jan. 7, 2010, 9 pages.
PCT International Search Report and Written Opinion, PCT/CN2009/071127, dated Jul. 9, 2009, 10 pages.
United States Office Action, U.S. Appl. No. 12/936,128, dated Jan. 16, 2013, 36 pages.
United States Office Action, U.S. Appl. No. 12/936,128, dated Jun. 16, 2014, 30 pages.
United States Office Action, U.S. Appl. No. 12/936,128, dated Mar. 2, 2015, 30 pages.
United States Office Action, U.S. Appl. No. 12/936,128, dated Oct. 1, 2013, 23 pages.
United States Office Action, U.S. Appl. No. 13/748,065, dated Dec. 13, 2013, 11 pages.
United States Office Action, U.S. Appl. No. 13/748,065, dated Dec. 26, 2014, 11 pages.
United States Office Action, U.S. Appl. No. 13/748,065, dated Jul. 17, 2014, 11 pages.
United States Office Action, U.S. Appl. No. 13/748,065, dated Jun. 21, 2013, 9 pages.
United States Office Action, U.S. Appl. No. 15/082,849, dated Mar. 23, 2017, 10 pages.
United States Office Action, U.S. Appl. No. 15/082,849, dated Jul. 28, 2016, 11 pages.

* cited by examiner

POINT OF INTEREST SEARCH ALONG A ROUTE

CROSS-REFERENCE TO RELATED APPLICATIONS

This application is a continuation of co-pending U.S. application Ser. No. 15/082,849 filed on Mar. 28, 2016, which is a continuation of U.S. application Ser. No. 12/936,128, now U.S. Pat. No. 9,304,008, issued Apr. 5, 2016, which is a National Stage Entry of PCT Application PCT/CN2009/071127, filed on Apr. 1, 2009, which claims the benefit of U.S. Provisional Application No. 61/041,496, filed on Apr. 1, 2008. Each application is incorporated by reference herein in its entirety.

BACKGROUND

Field of the Invention

The present invention is directed to the use of navigation systems. In particular, the present invention enables better timing and routing information to be provided related to points of interest along a route.

Description of the Related Art

Navigation systems are popularly used to guide travelers to destinations. Such systems are available built into vehicles or free-standing, to be moved from vehicle to vehicle; for use by drivers and/or pedestrians; as purpose-built devices or as applications on general-purpose devices such as personal digital assistants or mobile telephones; and as systems that are entirely self-contained or as systems that utilize a remote server to perform some or all of their calculations. We refer generally to these systems as "navigation systems."

Since a common use of navigation systems is to guide the traveler to a desired destination, an important function of such systems is the selection of the destination. In some cases, the driver selects the destination by entering the address. In others, the driver selects the destination from a personal list of stored destinations, typically including home and work. In addition, the driver often wants to select a destination from a directory of "points of interest".

Points of interest ("POIs") include many kinds of destinations that drivers may want to find, either when running errands near home or when traveling away from home, such as hotels, restaurants, gas stations, stores of various kinds, roadside rest areas, and emergency services such as hospitals or police stations. The driver may want to search for any POI in a given category (e.g., any restaurant), or for a POI with a given name in a given category (e.g., a restaurant whose name contains "Taqueria"), or for a POI with a given name in any category (e.g., a POI whose name contains "Taqueria", without knowing whether the category should be "restaurant" or "fast food"). The driver may want to search for POIs radially around the current location, without regard to any previous or current destination. Alternatively, the driver may want to search for POIs near an already-computed route, for example, finding a gas station near the currently planned route to a destination. All of these kinds of search are commonly supported in modern navigation systems.

SUMMARY

The present invention enables searches for points of interest along a route. A driver may be looking more or less urgently for a POI, and may therefore be willing to travel a greater or lesser distance off the currently-planned route. A driver who suddenly notices a fuel gauge approaching "empty" may be willing to travel several miles off-route to find a gas station soon, while a driver who is just beginning to feel hungry may be willing to drive half an hour down the route to find a restaurant very close to the route. The present invention also enables searching for POIs along a current route, even when the route has not been pre-programmed by the driver.

A system in accordance with the present invention includes a GPS module, user interface module, database and routing engine. To find a list of nearby POIs, for example upon request by a driver, in one embodiment the routing engine identifies POIs in the database that are located within a threshold distance from the planned route in Euclidean distance. The routing engine then filters the results by exploring the road network to determine whether each of the POIs is within the threshold distance of the route in driving distance. The filtering may include exploring outward from the POI, e.g., using Dijkstra's algorithm, until either all roads within the threshold distance are explored or the route is reached; alternatively, distance to the POIs can be checked by exploring outward from the route until all roads within the threshold distance of the route have been exposed. For those POIs reached in the exploration, the nearest point on the route and the distance to that point are known. Similar searches are performed based on driving time rather than distance.

DETAILED DESCRIPTION OF THE PREFERRED EMBODIMENTS

Since navigation systems are commonly used by drivers of vehicles, we frequently refer to the user of such a system as "the driver". However, the description that follows is not intended to be limited only to vehicle drivers; it may be applied equally to any use in which the user of the system is any kind of traveler, including, for example, a pedestrian, a bicycle rider, or a person using multiple modes of transportation, such as walking and riding public transit vehicles. In addition, while described in the context of public roadways and highways, the described systems and methods may also be used for aircraft navigation and marine navigation.

Figure 1:
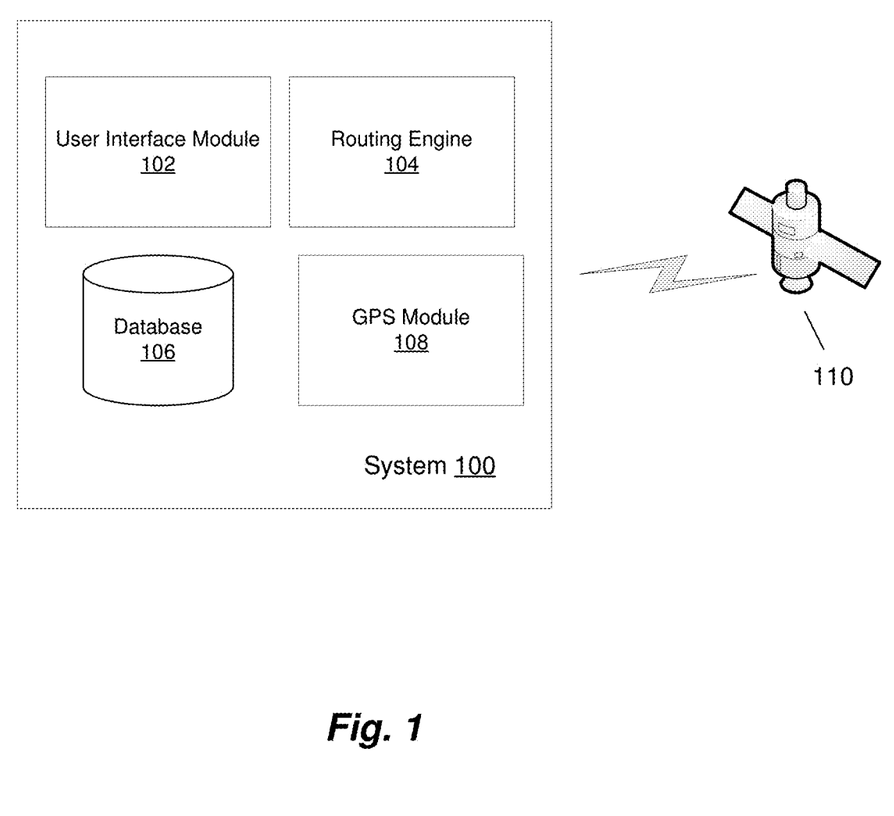
FIG. 1 is a block diagram of a navigation device in accordance with an embodiment of the present invention.

FIG. 1 is a diagram of a system 100 in accordance with an embodiment of the present invention. System 100 includes a user interface (UI) module 102, a routing engine 104, a database 106, and GPS module 108. UI module 102 provides one or more screens of information and enables the driver to communicate with the navigation system 100.

Routing engine 104 manages route planning and guidance functions, including routing to POIs along a route as described below. Database 106 provides local storage for navigation system 100 and may include information about POIs and other features such as roads, intersections, terrain, and the like. GPS module 108 performs GPS location functions and receives GPS signals from GPS satellites 110. Note that although in the described embodiment navigation system 100 uses GPS to determine its location, alternative technology may be used, particularly as newer technology is developed. The present invention is equally applicable regardless of the manner in which system 100 derives its location.

User interface module 102 provides many of the user interface functions conventionally available on personal navigation devices. For example, UI module 102 allows a user to specify a destination by entering an address or selecting from a list. In addition, UI module 102 in various embodiments of the present invention includes interface elements for receiving POI search preferences from a driver, and for presenting POI search results and routing information, as described more fully below.

We begin with an example to illustrate the operation of system 100. In this example, a driver sets out on a lengthy road trip from San Francisco, Calif. to Alexandria, Va. Routing engine 104 plots the best route, taking into account any preferences selected by the driver—for example, avoiding toll roads. User interface module 102 displays the plotted route, and the driver sets out along Interstate 80 heading east.

After driving for several hours, the driver begins to get hungry. By referring to the user interface, the driver observes he has just passed through Mill City, Nev. The next major town along his route is Winnemucca, which is likely to have several restaurant options. Alternatively, the small town of Cosgrave, which has a single restaurant, is much closer. Cosgrave, however, is not along the interstate, and would require a deviation of some distance from the driver's planned route. While eating sooner would be a positive experience for the driver, it is also important to him to arrive in Salt Lake City, Utah before dark. He is unsure of the delay involved in deviating to the Cosgrave restaurant, and would prefer to make an informed choice.

By selecting a POI search function in the user interface, the driver is presented by system 100 with a list of POIs from which to choose. The list may be presented in a number of ways, depending on implementation. In one embodiment, for example, the user selects POI search, then filters by a restaurants category. User interface module 102 then presents the driver with a list of restaurants within a given distance (which may be radial, driving time, or driving distance, as explained below). For each POI not along the driver's route, user interface module 102 displays two distances: the distance down the route to a point from which the driver would deviate toward the POI (the "along-route distance" to the "route departure point"), and the distance by which the POI is off the route (the "off-route distance"). In our example, the along-route distance is 8.5 miles, and the off-route distance is 1.1 miles. Alternatively, the driver can configure system 100 to display the estimated time off-route caused by the deviation based on information stored in database 106 about the detour, including for example the estimated speed along the off-route portion. In this example, the delay is about two minutes. The driver decides that the two minutes is an acceptable time, and therefore deviates to Cosgrave.

Figure 2:
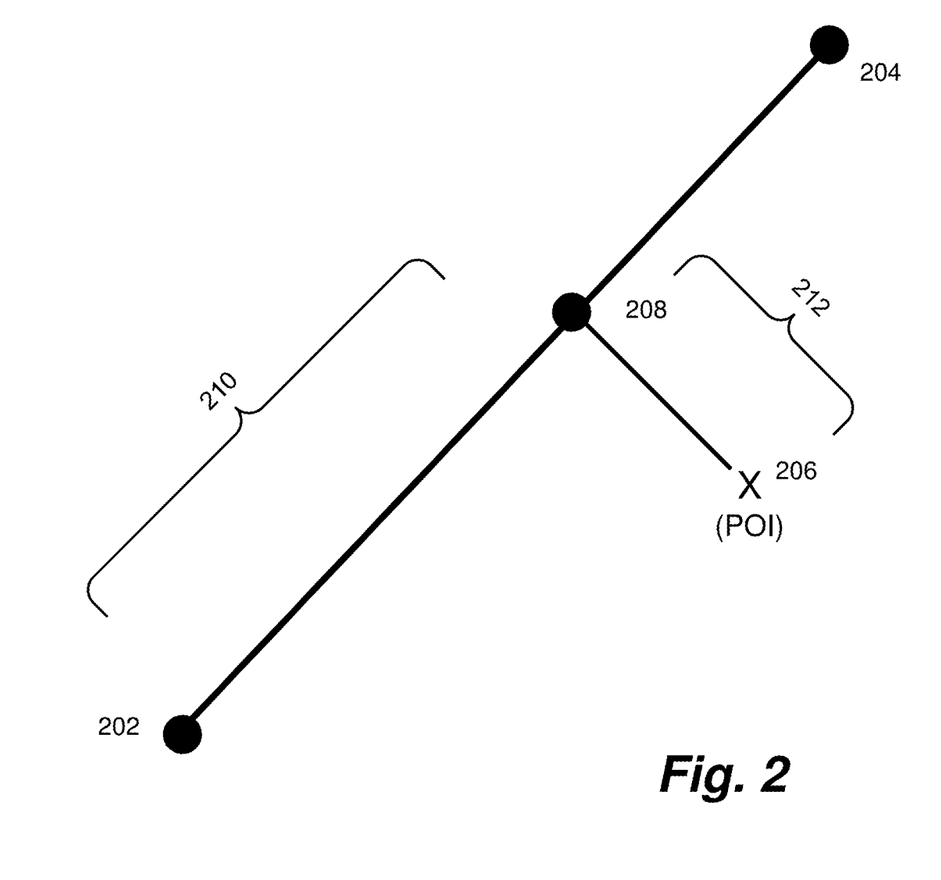
FIG. 2 illustrates a routing from an origin to a destination and a point of interest in accordance with an embodiment of the present invention.

FIG. 2 illustrates the distinction between along-route distance and off-route distance. In FIG. 2, the driver's planned route is from point 202 to point 204. Assume a POI is located at point 206, and to get to the POI the driver has to turn off the route onto another road at point 208. Then the along-route distance 210 is the distance from 202 to 208, and the off-route distance 212 is the distance from point 208 to 206.

In another embodiment, the two distances are, first, the sum of the along-route distance and the off-route distance (the "total distance") and, second, the off-route distance. In yet another embodiment, the two distances are the along-route distance and the total distance.

In conventional navigation systems showing one distance to each POI, the POIs are typically sorted in order of increasing distance. In one embodiment of the present invention, routing engine 104 sorts POIs in order of increasing along-route distance. In other embodiments, routing engine 104 sorts POIs in order of increasing total distance or in order of increasing off-route distance. Note that the distance used as the sort criterion need not be one of the distances displayed by user interface module 102.

Figure 3:
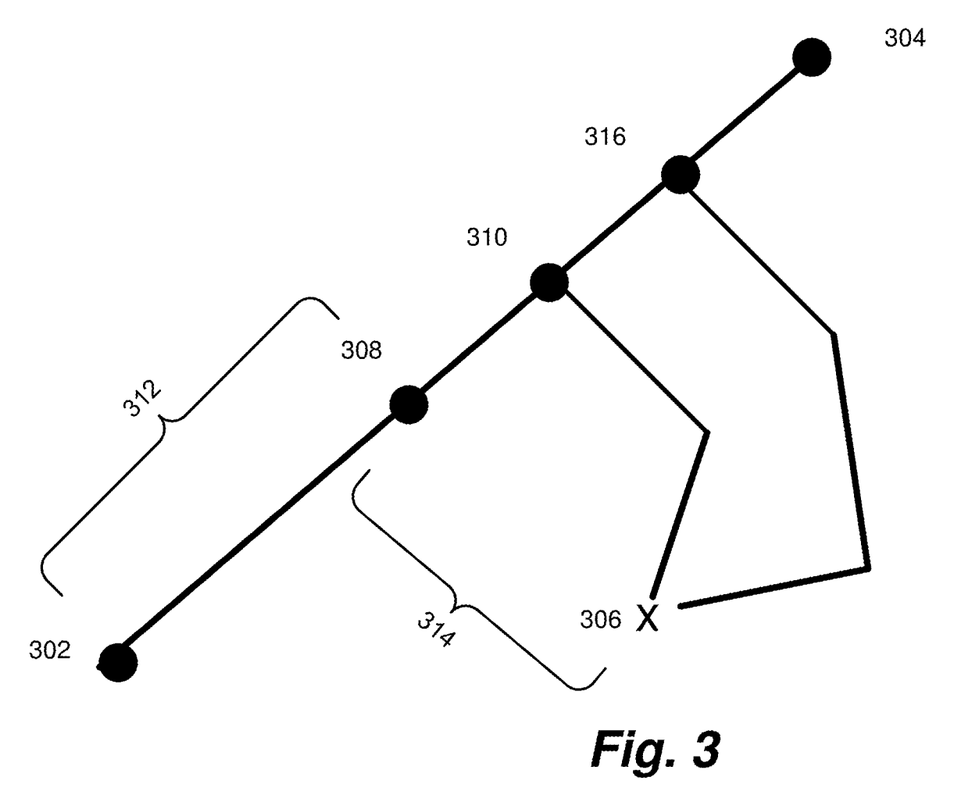
FIG. 3 illustrates multiple routings from an origin to a point of interest in accordance with an embodiment of the present invention.

In one embodiment, and referring to FIG. 3, the along-route and off-route distances are computed purely geometrically. In this embodiment, the route departure point 308 is the point on the route nearest to the POI 306 in Euclidean distance, the off-route distance of the POI is the Euclidean distance 314 from the route departure point 308 to the POI 306, and the along-route distance 312 is the distance, measured along the route, from the current location 302 to the route departure point 308. In another embodiment, the along-route and off-route distances are computed by measuring driving distance. In this embodiment, the route departure point is a point on the route 310 from which the driving distance (rather than the Euclidean distance) to the POI is minimized, the off-route distance is the driving distance along roads, rather than the Euclidean distance, from the route departure point 310 to the POI 306, and the along-route distance is the driving distance along the route from the current location 302 to the route departure point 310. In another embodiment, another metric to be minimized is used instead of driving distance. For example, estimated driving time can be used. In that case, the route departure point is a point 302 on the route from which the estimated driving time to the POI 306 is minimized, the off-route "distance" is the estimated driving time from the route departure point 316 to the POI 306, and the along-route "distance" is the estimated driving time from the current point 302 to the route departure point 316. One of ordinary skill in the art will understand that a wide variety of distance measures can be used.

In some embodiments, the definition of along-route and off-route distance can be varied slightly, in the following way: The route departure point is a point on the route such that the distance along the route to the point plus the distance from the point to the POI is minimized. Here "distance" can be driving distance, estimated driving time, or any other measure of distance to be minimized.

In one embodiment, the search for POIs is limited to a "search distance", that is, a specified distance (in terms of Euclidean distance, driving distance, estimated driving time, or another distance measure) from the route. That is, only POIs within this distance threshold will be displayed to the user. In one embodiment, the user specifies different default search distances for different categories. For example, the driver may be willing to travel 5 miles from the route to reach a gas station, but only 3 miles from the route to reach a restaurant. In one embodiment, user interface module 102 offers the driver, in addition to a list of POIs with their along-route and off-route distances, a "more urgent" and/or a "less urgent" button. As will be understood, as with other parts of the user interface, the "button" may be a real button, a virtual button on a touch-screen, or other suitable type of user interface element. When the "more urgent" button is pressed, the routing engine 104 repeats the search, but with a greater limit for the maximum off-route distance. Routing engine 104 will then tend to find more POIs closer to the current position, but farther off the route. When the "less urgent" button is pressed, routing engine 104 repeats the search, but with a smaller limit for the maximum off-route distance. Routing engine 104 will then tend to find POIs farther from the current position, but closer to the route and therefore more convenient for the driver if the driver is willing to drive farther before reaching the POI.

In one embodiment, common POI searches are made more convenient to the driver by having one or more "I need" buttons accessible to the user with fewer actions (e.g., by pressing fewer buttons) than for general POI searches. In one embodiment, for example, the map display screen of user interface module 102 has an "I need gas" button and an "I need food" button on screen for quick access to searches. In another embodiment, the map display screen has an "I need" button; when the "I need" button is pressed, the screen switches to a simple menu with very common, popular choices, for example, "I need gas", "I need a hotel" and "I need food." In some embodiments, the selection of "I need" buttons on the primary map screen or on the secondary screen is configurable by the user. Thus, one driver who likes coffee can put coffee outlets in the quick "I need" menu, while another driver who doesn't like coffee but does like to buy soft drinks at convenience stores can leave coffee off the quick "I need" menu but include convenience stores.

In some embodiments, routing engine 104 is able to search along a route even when there is no route currently calculated. For example, a driver may not have calculated a route because the driver is so familiar with the route that guidance is not necessary. Still, the driver may want to search for unfamiliar POIs such as gas stations or fast-food outlets even along a familiar route. Routing engine 104 is enabled to perform this kind of search by inferring a likely route. In one embodiment, routing engine 104 assumes that the driver will continue along a route with the same name as far as possible, and, when the road name does not continue, that the driver will continue as nearly straight as possible along roads of the same or greater importance. Routing engine 104 then uses that inferred route as the route along which to search. In such a case, the route may be searched in a conventional manner, or using the techniques described here. In alternative embodiments, routing engine 102 makes the inference more likely by tracking the driver's behavior over multiple trips, and, when the driver is on a road that system 100 recognizes as being used often in the driver's habitual behavior, inferring that the driver will follow the route that he or she most often follows when on the current road. In one embodiment, system 100 stores a history of previous routes (whether pre-programmed or not) taken by the driver. The number of routes in the history is variable according to the preference of the implementer and/or the driver. Route generator 104 then searches previous routes to predict whether the driver is currently following one of them. Route generator 104 then chooses the route with the highest prediction score in order to infer the route and provide POI assistance. In another embodiment, route generator 104 maintains a list of past destinations (as opposed to routes to the destinations), and identifies one or more of the past destinations located in or near the direction of travel. A destination is in or near the direction of travel in one embodiment if the distance to the destination is decreasing. Route generator 104 then selects the previous destination being approached most rapidly and plots a route to it. This route is then the predicted route along which POIs are searched.

Figure 4:
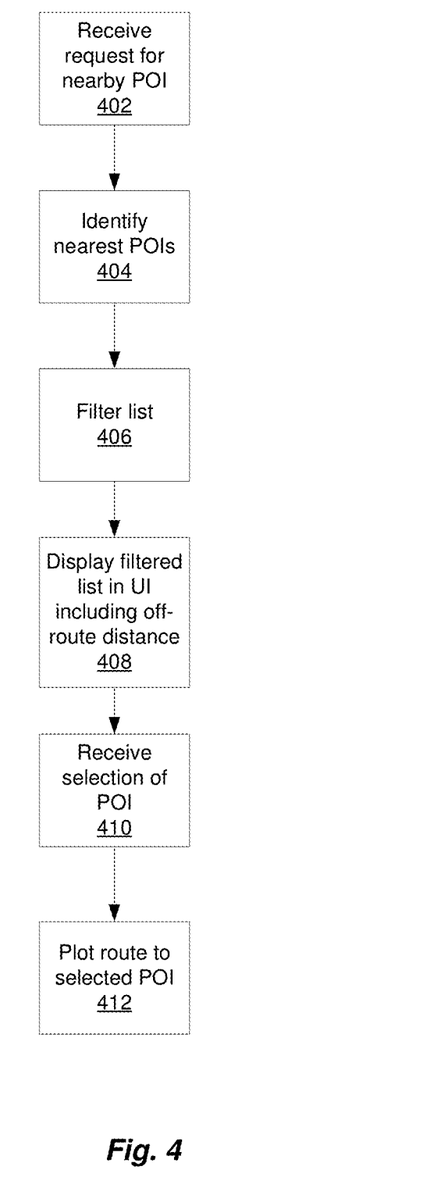
FIG. 4 is a flowchart illustrating a method for providing point-of-interest search along a route in accordance with an embodiment of the present invention.

FIG. 4 is a flowchart illustrating a method for providing point-of-interest search along a route in accordance with an embodiment of the present invention. System 100 receives 402 a request from a driver to display a list of nearby POIs. As noted, this request may be limited to specific categories, or may simply be a request for all known POIs along the route. Also as noted, the request includes a distance or time limitation, or alternatively a default limitation is used. Routing engine 104 performs a search, for example using database 106, and identifies 404 a set of nearby POIs. Routing engine 104 then filters 406 the list according to the distance or time parameters supplied by the driver or by default. User interface module 102 displays 408 the filtered list, along with deviation information including along-route and off-route distances or times, etc., as described above. In one embodiment, for example where the driver does not need directions to the POI, the driver simply proceeds without obtaining further route guidance. Alternatively, the driver requests and the user interface module receives 410 a selection of the POI, and then plots 412 a route to the selected POI.

Figure 5:
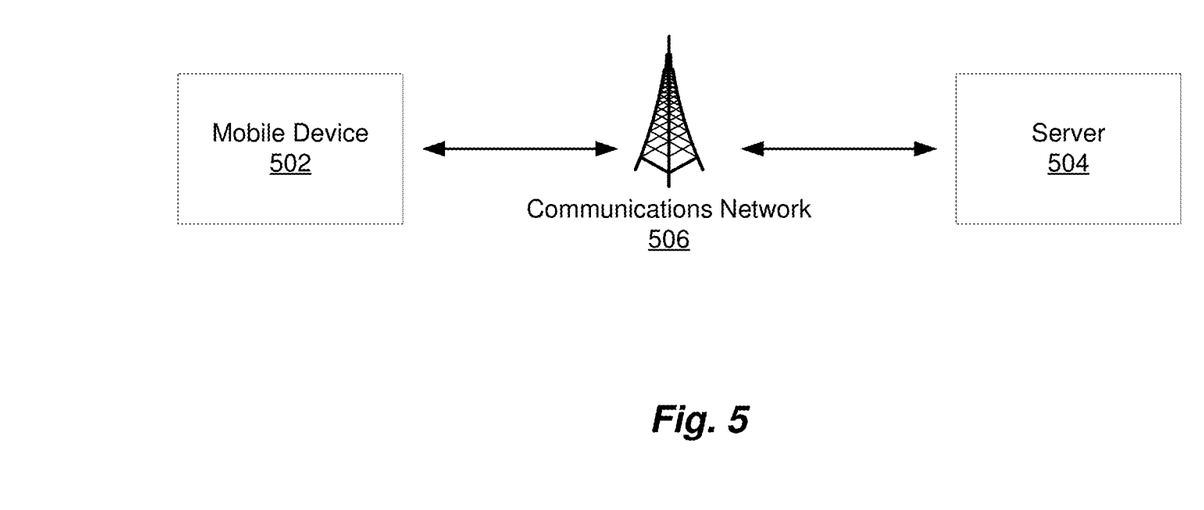
FIG. 5 illustrates communication between a mobile device and a server in accordance with an embodiment of the present invention.

In various embodiments, the computations described above are performed not on the mobile device but rather on a server. FIG. 5 illustrates a server 504 that is in communication via a communications network 506 with mobile device 502. The driver's particular request for a POI and data about the driver's current location and planned route or direction of travel are sent by mobile device 502 to server 504 via communications network 506. Server 504 determines the list of appropriate results and returns the information to mobile device 102 for display to the user. This allows mobile device 502 to operate with less processing and storage requirements, and also allows for more centralized updating of POI and routing information.

Techniques for searching based on Euclidean distance are known to one of ordinary skill in the art. There are many ways to search in an area such as the area along a route. One indexing scheme is taught in U.S. Pat. No. 5,963,956, incorporated herein by reference in its entirety. In that method, and in many other known indexing methods, it is possible to find records that come within a specified distance of the route. One can retrieve all POIs in such records, and then compute the Euclidean distance to the route and the nearest point on the route, and discard those POIs for which the Euclidean distance to the route exceeds the desired threshold.

When searching is to be based on driving distance, the search can be performed by starting with a search based on Euclidean distance and then adding an additional filtering step. Suppose the threshold distance is d km. If a POI is more than d km from the route in Euclidean distance, it is certainly more than d km from the route in driving distance, since the driving distance must be at least as long as the Euclidean distance, which is essentially a straight line. Thus a first search operation can find those POIs within d km of the route in Euclidean distance. Then the road network can be explored to determine whether the POI is within d km of the route in driving distance.

This secondary filtering operation can be performed in either of two ways. The road network can be explored (using, for example, Dijkstra's algorithm, which is well known to practitioners of the art) outward from the POI until all roads within a distance if d km have been explored or until the route is reached, whichever comes first. If the route is not found within d km of the POI, the POI is more than d km in driving distance from the route and can be rejected. If the route is found within d km of the POI, we know the nearest point on the route and the distance to that nearest point.

Alternatively, the distance to multiple POIs can be checked simultaneously by exploring the road network (using, for example, Dijkstra's algorithm) outward from the route, rather than from the POIs. The exploration can be performed until all roads within d km of the route have been explored. For those POIs which have been reached in the exploration, we know the nearest point on the route and the distance to that point. Those POIs which are not reached in the exploration are not within d km of the route.

In some cases, exploration from the POIs is more efficient, and in others exploration from the route is more efficient. In general, the denser the POIs are in the area around the route, the more efficient it is to perform the search starting at the route. In some embodiments, a decision is made at run time whether to search from the POIs or from the route on the basis of a criterion involving the length of the route, the search radius, and the number of POIs that pass the initial test. In one such embodiment, the test is performed as follows: The assumption is made that the amount of computation expended in searching is roughly proportional to the search area. If the length of the route is l, and the maximum search distance is r, the area to be searched if searching starts at the route is approximately $2lr+\pi r^2$. If, further, the number of POIs that pass the initial filter is n, the area to be searched if searching starts at the POIs is approximately $n\pi r^2$. This means that the amount of computation expended if starting at the POIs exceeds that expended if starting at the route if and only if $n\pi r^2 > 2lr+\pi r^2$, i.e., if and only if $(n-1)\pi r > 2l$, i.e., if and only if $n > 1+2l/\pi r$. Accordingly, the search is made from the POIs if $n \leq 1+2l/\pi r$ and from the route if $n > 1+2l/\pi u$. (The case in which n is exactly equal to $1+2l/\pi r$ is rare, and thus there is little or no difference which decision is made in that case.)

When searching is based on driving time, the search is performed in much the same manner. If driving time is to be estimated, then there is a speed associated with each road element in the map. Routing engine 104 can therefore know the maximum speed associated with any road anywhere in the database. By using that maximum speed, it can determine a maximum distance such that any POIs within the maximum driving time at the maximum speed must also be within the maximum distance. (If the driving-time threshold is t hours, and the maximum speed anywhere in the database is s km/h, then any point within a driving time of t hours will also be within a driving distance of st km, and therefore also within a Euclidean distance of st km.) The first filtering can be performed as described above, and then exploration using driving time can be performed exactly as described above for exploration using driving distance.

As noted above, in some embodiments, the route departure point is chosen so as to minimize not the driving distance from the route to the POI, but rather the total distance from the origin to the route departure point plus the distance to the POI. In such embodiments, the step of finding the route departure point can be performed with a modification to Dijkstra's algorithm. Dijkstra's algorithm as usually implemented maintains a best known distance from the origin to each node in the exploration, as well as an indication of the previous node in the best route from the origin. In this embodiment, Dijkstra's algorithm is modified so that, for each node, both a best known distance from the origin and a distance from the initial route are maintained, as well as an indication of the previous node. For each node in the initial route, the best known distance from the origin is initialized to be the distance from the origin to that node, and the distance from the route is initialized to zero. Then Dijkstra's algorithm is applied in the usual way, but a given node is not explored from if the distance from the route is greater than the limiting distance. POIs not reached in this exploration are beyond the limiting distance. The route that minimizes the distance to each POI from the origin is obtained by following the references to previous nodes from the POI back until the original route is reached.

While the present invention has been described above in particular detail with respect to a limited number of embodiments, other embodiments are possible as well. The particular naming of the components and their programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, as illustrated for example by the description of FIG. 4, and functions performed by multiple components may instead performed by a single component. For example, the particular functions of the routing engine 104 may be provided in many or one module.

The operations described above, although described functionally or logically, may be implemented by computer programs stored on one or more computer readable media and executed by a processor. Computer readable storage media include, for example, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

Throughout the description, discussions using terms such as "processing" or "computing" or "calculating" or "determining" or "displaying" or the like, refer to the action and processes of a particular computer system, or similar electronic computing device, that manipulates and transforms data representing or modeling physical characteristics, and which is represented as physical (electronic) quantities within the computer system memories or registers or other such information storage, transmission or display devices.

The algorithms and displays presented above are not inherently related to any particular computer or other apparatus. Various general-purpose systems may also be modified by using the teachings herein, or it may prove convenient to construct more specialized apparatus to perform the described method steps. The required structure for a variety of these systems will appear from the description above. In addition, the present invention is not described with reference to any particular programming language, any suitable one of which may be selected by the implementer.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A method for providing navigation information to a driver, the method comprising:
    determining, by a computing system, a first road on which a computing device of a user is located based on GPS signals, the computing device travelling along the first road in a first direction;
    responsive to determining that the first road has an end in the first direction, selecting, by the computing system, a second road of one or more roads connected to the end of the first road, the second road selected based on an inferred route of the user;
    determining, by the computing system, one or more points of interest along the second road that the user has not previously visited; and
    causing, by the computing system, the computing device to present, in a user interface, information corresponding to at least one of the one or more points of interest.

2. The method of claim 1, further comprising:
    determining, by the computing system, the inferred route by comparing the first direction with directions of the one or more roads.

3. The method of claim 2, wherein selecting the second road of the one or more roads further comprises:
    determining, by the computing system, that the first direction is approximately parallel to a second direction of the second road based on the comparison.

4. The method of claim 1, wherein selecting the second road of the one or more roads further comprises:
    determining, by the computing system, that the second road has a same or greater importance as that of the first road.

5. The method of claim 1, further comprising:
    determining, by the computing system, the inferred route based on frequencies at which the user traveled on each of a plurality of previous routes to points of interest.

6. The method of claim 5, further comprising:
    determining, by the computing system, that the user is traveling along a given previous route of the plurality of previous routes based on the GPS signals, the given previous route including the second road.

7. The method of claim 1, further comprising:
    receiving, by the computing system from the computing device, input indicating a category of a point of interest from the user via the user interface; and
    determining the one or more points of interest by filtering a plurality of points of interest based on the category.

8. The method of claim 1, further comprising:
    receiving, by the computing system from the computing device, configuration input from the user via the user interface; and
    causing, by the computing system, the computing device to update the user interface based on the configuration input, the updated user interface presenting at least one user interface element designated with a category of a point of interest.

9. The method of claim 8, wherein the at least one user interface element includes one or more of an "I need gas" button, an "I need a hotel" button, and an "I need food" button.

10. A computer program product comprising a non-transitory computer readable storage medium having instructions encoded thereon that, when executed by one or more processors, cause the one or more processors to:
    determine, by a computing system, a first road on which a computing device of a user is located based on GPS signals, the computing device travelling along the first road in a first direction;
    responsive to determining that the first road has an end in the first direction, select, by the computing system, a second road of one or more roads connected to the end of the first road, the second road selected based on an inferred route of the user;
    determine, by the computing system, one or more points of interest along the second road that the user has not previously visited; and
    cause, by the computing system, the computing device to present, in a user interface, information corresponding to at least one of the one or more points of interest.

11. The non-transitory computer readable storage medium of claim 10, comprising further instructions encoded thereon that, when executed by the one or more processors, cause the one or more processors to:
    determine, by the computing system, the inferred route by comparing the first direction with directions of the one or more roads.

12. The non-transitory computer readable storage medium of claim 11, comprising further instructions encoded thereon that, when executed by the one or more processors, cause the one or more processors to:
    determine, by the computing system, that the first direction is approximately parallel to a second direction of the second road based on the comparison.

13. The non-transitory computer readable storage medium of claim 10, wherein selecting the second road of the one or more roads further comprises:
    determining, by the computing system, that the second road has a same or greater importance as that of the first road.

14. The non-transitory computer readable storage medium of claim 10, comprising further instructions encoded thereon that, when executed by the one or more processors, cause the one or more processors to:
    determine, by the computing system, the inferred route based on frequencies at which the user traveled on each of a plurality of previous routes to points of interest.

15. The non-transitory computer readable storage medium of claim 14, comprising further instructions encoded thereon that, when executed by the one or more processors, cause the one or more processors to:
    determine, by the computing system, that the user is traveling along a given previous route of the plurality of previous routes based on the GPS signals, the given previous route including the second road.

16. The non-transitory computer readable storage medium of claim 10, comprising further instructions encoded thereon that, when executed by the one or more processors, cause the one or more processors to:
    receive, by the computing system from the computing device, input indicating a category of a point of interest from the user via the user interface; and
    determine the one or more points of interest by filtering a plurality of points of interest based on the category.

17. The non-transitory computer readable storage medium of claim 10, comprising further instructions encoded thereon that, when executed by the one or more processors, cause the one or more processors to:

receive, by the computing system from the computing device, configuration input from the user via the user interface; and cause, by the computing system, the computing device to update the user interface based on the configuration input, the updated user interface presenting at least one user interface element designated with a category of a point of interest.

18. The non-transitory computer readable storage medium of claim 17, wherein the at least one user interface element includes one or more of an "I need gas" button, an "I need a hotel" button, and an "I need food" button.

19. A system for providing navigation information, the system comprising:

a processor;

a global navigation satellite system radio, adapted to determine a current location of a computing device of a user;

a routing engine, coupled to the global navigation satellite system and executed by the processor, adapted to:

determine a first road on which the computing device is located based on the current location, the computing device travelling along the first road in a first direction;

responsive to determining that the first road has an end in the first direction, select a second road of one or more roads connected to the end of the first road, the second road selected based on an inferred route of the user;

determine one or more points of interest along the second road that the user has not previously visited; and cause the computing device to present, in a user interface, information corresponding to at least one of the one or more points of interest.

20. The system of claim 19, wherein the routing engine is further adapted to:

receive, from the computing device, input indicating a category of a point of interest from the user via the user interface; and determine the one or more points of interest by filtering a plurality of points of interest based on the category.

* * * * *